Patented Dec. 4, 1928.

1,693,735

UNITED STATES PATENT OFFICE.

KALMAN WARGA, OF NEW YORK, N. Y., ASSIGNOR TO CLARENCE W. BICKFORD AND MARY BICKFORD, BOTH OF OSCEOLA MILLS, PENNSYLVANIA.

METHOD OF DECORATING GLASS SURFACES.

No Drawing.   Application filed November 17, 1927.  Serial No. 234,054.

The present invention relates to a method of decorating glass surfaces, more particularly that of glass containers, such as bottles or the like, which are manufactured by the aid of molds. The invention pertains more particularly to an improvement in that method of decorating glass surfaces, wherein the designs are formed of mineral pigments and fluxes and fixed to the glass surfaces by firing.

Heretofore, as far as known, the designs were applied to the glass containers when the latter are in their cold state, the containers being then placed into an oven at a low initial temperature and gradually advanced therethrough to a maximum degree of heat requisite to produce fusion of the mineral pigments, whereby the said pigments attach themselves to the glass. After the design has been fixed to the glass, the glass is advanced through lower temperatures to nearly atmospheric temperature in a leer.

The main object of the present invention is to provide a method of decorating glass containers, wherein the designs are applied to the containers while the latter are still hot, that is to say previous to their introduction into the annealing leer, and fixed to the containers simultaneously with and by the annealing operation.

With these and other objects in view, which will more fully appear as the nature of the invention is better understood, the method consists in the several steps hereinafter recited and pointed out in the appended claims, it being understood that several changes may be made in the method, within the scope of the claims without departing from the spirit or sacrificing any of the advantages of the invention.

The design is produced on tissue-paper by means of mineral colors or pigments which are incorporated in or mixed with fluxes or binders of or containing vitreous material. These colors or pigments are each mixed with a suitable quantity of flux so as to fuse at the same temperature or, in other words, so as to have the same melting point. The design is printed upon the paper, preferably, by lithographic printing, the darkest color in the series being first applied to the paper, the next lighter thereafter, and so on, until the lightest color is reached in the last printing step. After all the colors have been applied, the printed surface may be covered with decalcomania varnish or lithographic varnish, while on the back of the paper is spread a layer of rosin.

In carrying out the process, forming the subject matter of the present application for Letters Patent, the glass container, manufactured by pressing or blowing, is removed from its mold previous to its entry into the annealing leer. The printed paper, prepared as above stated, is attached by the rosin layer to the interior surface of a mold in proper relation to the surface of the glass container to which it is to be fixed, the container, in its hot state, placed into the mold, and the latter closed and put into the annealing leer. In passing through the leer, the several colors or pigments melt and fix themselves to the glass container. Upon withdrawal from the leer, the design is found to be irremovably fixed upon the glass object without any running or mixing of the colors, or without any distortion of the glass object or without any blistering or clouding of the design. The colors do not run one into another, as they are being fixed to the glass object, by reason of the fact that temperature of the glass object is gradually decreased as it travels through the leer. On the other hand, no distortion of the glass object can take place because the latter is confined in a mold exactly like that in which it was originally contained during the molding operation. The paper is consumed, while the fixing operation takes place.

It is obvious that in printing the design, a reversed image must be produced.

The method described herein is applicable to multi-color decorations and to single-color decorations, without departing from the invention.

From the foregoing it will be noted that considerable time is saved in fixing the design upon the glass container by reason of the fact that the said operation takes place simultaneously with the annealing of the container. Furthermore, special handling of the container is done away with and fuel is saved, in contradistinction to the methods heretofore in use in which the printed paper is applied to the container when the latter is in its cold state.

What I claim is:

1. The method of fixing designs on glass objects, which consists in, first, forming the design in color films containing each a mineral pigment and a vitreous binding material, said films being all fusible at the same temperature, second, applying the design to the glass object while the latter is in hot state and within a mold, and, third, fixing by heat said films to said glass object while the latter gradually cools in its mold.

2. The method of fixing designs on glass objects, which consists in, first, forming the design in color films containing each a mineral pigment and a flux, said films being all fusible at the same temperature, second, applying the design to the glass object while the latter is in hot state and within a mold, and, third, fixing said films to said glass object while the latter gradually cools in its mold.

3. The method of fixing designs on glass objects, which consists in first, forming the design in color films containing each a mineral pigment and a vitreous binding material, said films being all fusible at the same temperature, second, placing the said design in a mold fitting the glass object, third, inserting the glass object in its hot state into said mold in contact with said design, and, fourth, fixing by heat said films to said glass object while the latter travels within the said mold through a leer.

4. The method of fixing designs on glass objects, which consists in, first, forming the design of a mineral pigment and a flux, second, applying the design to the glass object while the latter is in its hot state and within a mold, and, third, fixing said design to said glass object while the latter gradually cools in its mold.

Signed at New York, in the county of New York, and State of New York, this 15th day of November A. D. 1927.

KALMAN WARGA.